April 2, 1929. T. B. KEOGH 1,707,618
MANUALLY CONTROLLED VEHICLE
Filed Feb. 23, 1928
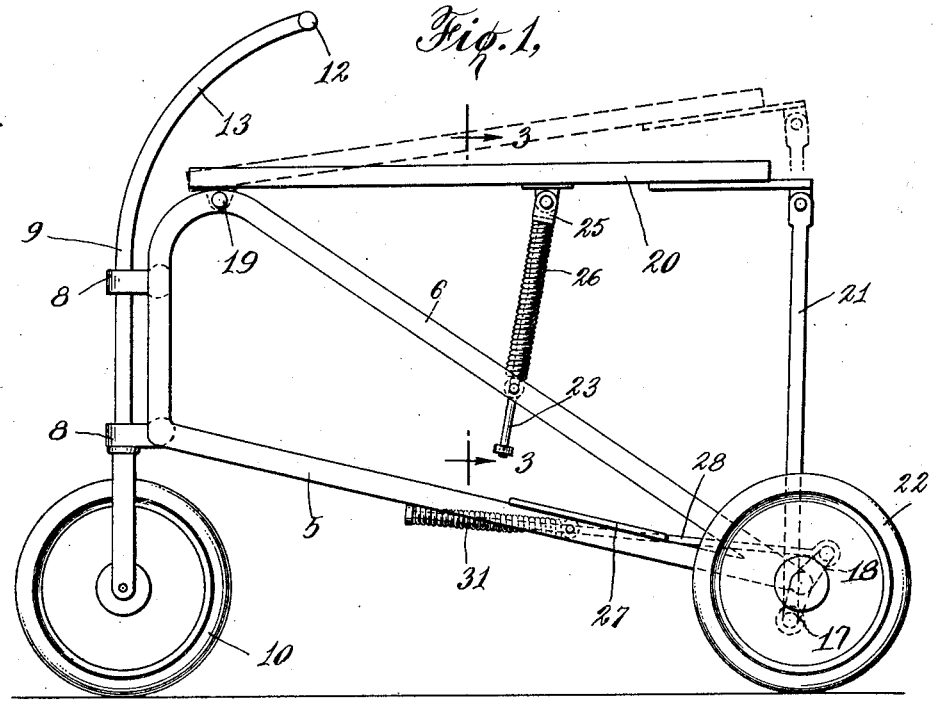
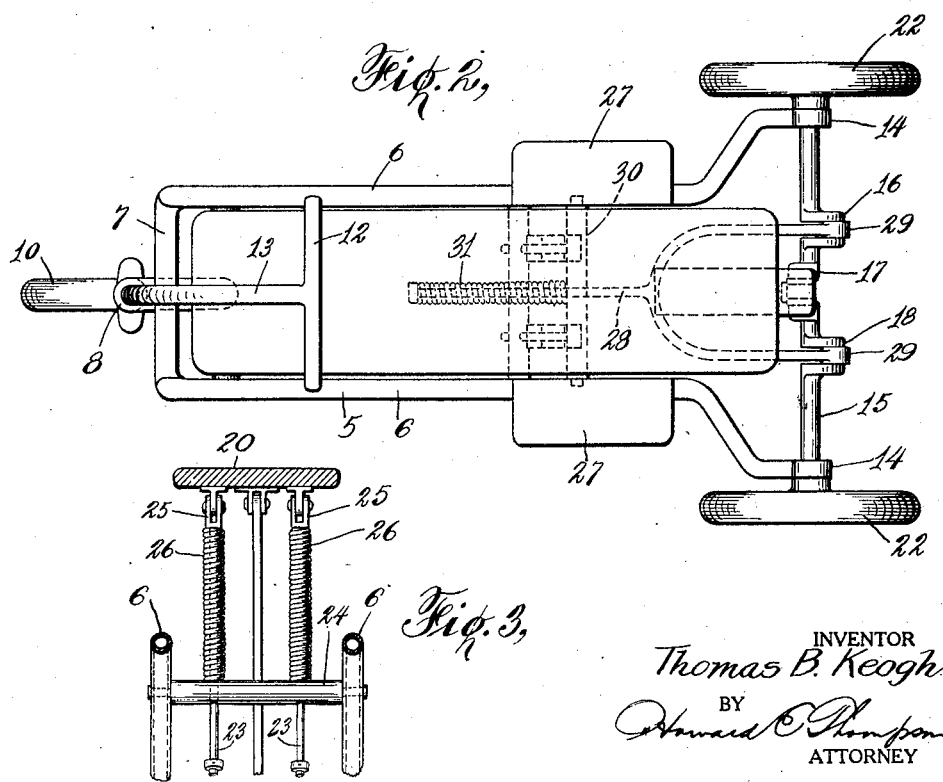
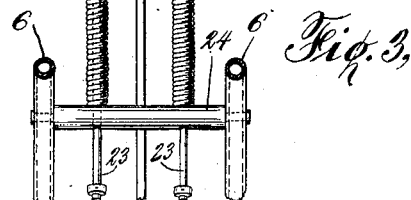
INVENTOR
Thomas B. Keogh
BY
ATTORNEY Patented Apr. 2, 1929.

1,707,618

UNITED STATES PATENT OFFICE.

THOMAS B. KEOGH, OF NEW YORK, N. Y.

MANUALLY-CONTROLLED VEHICLE.

Application filed February 23, 1928. Serial No. 256,121.

This invention relates to vehicles, and particularly to three-wheeled vehicles, operatable manually, and the object of the invention consists in the provision of a vehicle of what might be termed the see-saw type, wherein the manual and mechanical reciprocation of a pivot beam or seat member will operate to propel the vehicle over a roadway, said seat member being in operative connection with the drive wheel or wheels of the vehicle; a further object being to provide means for moving the crank shaft actuating the drive wheel or wheels over dead center position; a further object being to provide a small frame construction provided with platforms or supports for the feet of the operator and a comparatively narrow board or seat member, one end of which is pivoted to the frame, and a rod coupled with the free end of said seat member and with a crank shaft driving the drive wheels of the vehicle; a further object being to provide a steering wheel and control which will facilitate the turning of the vehicle within a very small radius, or a radius substantially equal to the length of the vehicle; and with these and other objects in view, the invention consists in an apparatus of the class and for the purpose specified, which is simple in construction and operation, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a side view of a vehicle made according to my invention.

Fig. 2 is a plan view thereof; and,

Fig. 3 is a partial section on the line 3—3 of Fig. 1.

In practice, I provide a frame 5 made from rods, tubing or like material, said frame comprising side members 6, a front crosshead 7 having projecting bearings 8 for a steering shaft 9, said shaft controlling a steering wheel 10, and being operated by a handle bar 12 at the upper end thereof, which end is preferably curved as seen at 13 to extend over the frame 5. The side members 6 of the frame at the rear end thereof are flared outwardly and extend backwardly and the ends terminate in bearings 14 for a crank shaft 15 having three cranks 16, 17 and 18, the cranks 16 and 18 being in axial alinement, while the crank 17 is arranged at an angle to the first named cranks. Pivotally mounted in connection with the upper end portion of the frame 5 or the side members 6 thereof as seen at 19 is a see-saw board or seat member 20, the free end of which extends backwardly and over the frame 5 in substantially horizontal position and pivoted to the rear and free end of the seat member 20 is a connecting rod 21 which is mounted upon the crank 17 whereby the vertical reciprocation of the seat member 20 on the pivot 19 will operate to rotate the crank shaft 15 and correspondingly rotate the two drive wheels 22 mounted in connection with the free ends of said crank shaft 15.

Pivotally mounted in connection with the end face of the seat member 20 are two rods 23 which also pass through a rotatable bearing 24 transversing the frame 5 as seen in Fig. 3 of the drawing and are slidably mounted therein. Mounted on said rods between the bearing 24 and the forked and pivoted ends 25 thereof are springs 26 which are adapted to raise the seat member 20 or aid in this operation when the vehicle is operated, it being understood that the operator places his feet on support or foot plates 27 projecting at the opposite sides of the frame 5 or the side members 6 thereof, and in initially starting the vehicle, raises the body off from the seat member 20 and then places his weight upon the seat member, which operation is repeated until the momentum of the vehicle has started sufficiently to permit of its operation by simply see-sawing up and down upon the seat member.

To facilitate carrying the crank shaft 15 over what might be termed a dead center position, I provide a rod 28 one end of which is forked and the separate members 29 formed by the forked end are mounted upon the cranks 16 and 18, and the rod 28 passes through a bearing 30 arranged transversely of the frame 5. Mounted on said rod forwardly of the bearing, is a spring 31, which when placed under tension will aid in pulling the crank shaft passed a dead center position.

It will be noted that the steering wheel 10 is free to rotate freely beneath the frame 5, thus facilitating the steering of the vehicle or turning thereof in a comparatively small space, and while the vehicle is primarily designed for use by children, it will be understood that any use of a vehicle constructed in accordance with my invention, may be made, and it will also be apparent that I am not necessarily limited to the specific construction herein shown and described, and various changes therein and modifications thereof may be made within the scope of the appended claims without departing from the spirit of my invention or sacrificing its advantages.

Having fully described my invention, what I claim as new and desire to secure by Letters Patent, is:—

1. A vehicle of the class described comprising a frame, wheels supported in connection with the frame and permitting the free movement of the vehicle over a roadway, driving means for one or more of said wheels, a reciprocating seat member on said frame, means for coupling the seat member with said driving means to propel the vehicle, tensional means for moving the seat member in one direction and means operating directly upon said driving means and independent of said seat member to aid in propelling the vehicle.

2. A vehicle of the class described comprising a frame, wheels supported in connection with the frame and permitting the free movement of the vehicle over a roadway, driving means for one or more of said wheels, a reciprocating seat member on said frame, means for coupling the seat member with said driving means to propel the vehicle, tensional means for moving the seat member in one direction, means operating directly upon said driving means and independent of said seat member to aid in propelling the vehicle, and said last named means operating in a plane substantially at right angles to said first named means.

3. A vehicle of the class described comprising a frame, a steering wheel supported in connection with the front end of the frame, a crank shaft supported in connection with the rear end of the frame, driving wheels on said shaft, a seat member, one end of which is pivotally mounted in connection with the frame, stationary foot rests on said frame, means for coupling the free end of the seat member with a crank of said crank shaft whereby an operator whose feet are supported upon the foot rests may reciprocate the seat member to propel the vehicle over a roadway by applying his weight to said seat member to move the same downwardly and by supporting his weight on the foot rests in the upward movement of the seat member, tensional means for moving the seat member upwardly, and tensional means cooperating with another crank of said crank shaft to aid in propelling the vehicle during the upward movement of the seat member.

4. A vehicle of the class described comprising a frame, a steering wheel supported in connection with the front end of the frame, a crank shaft supported in connection with the rear end of the frame, driving wheels on said shaft, a seat member, one end of which is pivotally mounted in connection with the frame, stationary foot rests on said frame, means for coupling the free end of the seat member with a crank of said crank shaft whereby an operator whose feet are supported upon the foot rests may reciprocate the seat member to propel the vehicle over a roadway by applying his weight to said seat member to move the same downwardly and by supporting his weight on the foot rests in the upward movement of the seat member, tensional means for moving the seat member upwardly, tensional means cooperating with another crank of said crank shaft to aid in propelling the vehicle during the upward movement of the seat member, and said last named tensional means being supported in connection with the frame and operating in a plane substantially at right angles to the plane of operation of the first named means.

5. A vehicle of the class described comprising a substantially V-shaped frame when viewed in elevation and consisting of a bottom frame member, a top frame member joining the bottom frame member at the rear of the vehicle and extending upwardly and forwardly, and a vertical frame member joining the forward ends of the top and bottom frame members, a steering wheel supported in connection with the front end of the frame, a seat member pivoted to the upper forward end of the frame and extending rearwardly in substantially a horizontal plane, the rear end of the seat member having a depending crank rod, a crank shaft mounted in the rear end of the frame and said crank rod being coupled with one of the cranks of said crank shaft, and drive wheels mounted upon said crank shaft and operated through the rotation of said crank.

6. A vehicle of the class described comprising a substantially V-shaped frame when viewed in elevation and consisting of a bottom frame member, a top frame member joining the bottom frame member at the rear of the vehicle and extending upwardly and forwardly, and a vertical frame member joining the forward ends of the top and bottom frame members, a steering wheel supported in connection with the front end of the frame, a seat member pivoted to the upper forward end of the frame and extending rearwardly in substantially a horizontal plane, the rear end of the seat member having a depending crank rod, a crank shaft mounted in the rear end of the frame and said crank rod being coupled with one of the cranks of said crank shaft, drive wheels mounted upon said crank shaft and operated through the rotation of said crank, a spring actuated crank rod supported in connection with the lower frame member and having a forked end portion and the separate members of which are coupled with two other cranks of the crank shaft arranged angularly with reference to the first named crank of said shaft.

7. A vehicle of the class described comprising a substantially V-shaped frame when viewed in elevation and consisting of a bottom frame member, a top frame member joining the bottom frame member at the rear of the vehicle and extending upwardly and forwardly, and a vertical frame member joining the forward ends of the top and bottom frame members, a steering wheel supported in connection with the front end of the frame, a seat member pivoted to the upper forward end of the frame and extending rearwardly in substantially a horizontal plane, the rear end of the seat member having a depending crank rod, a crank shaft mounted in the rear end of the frame and said crank rod being coupled with one of the cranks of said crank shaft, drive wheels mounted upon said crank shaft and operated through the rotation of said crank, a spring actuated crank rod supported in connection with the lower frame member and having a forked end portion, the separate members of which are coupled with two other cranks of the crank shaft arranged angularly with reference to the first named crank of said shaft and two spring members supported upon guide rods slidably engaging the upwardly inclined top frame member and pivotally coupled to the seat member for moving the seat member in an upward direction and to aid in the propulsion of the drive wheels.

8. A vehicle of the class described comprising a substantially V-shaped frame when viewed in elevation and consisting of a bottom frame member, a top frame member joining the bottom frame member at the rear of the vehicle and extending upwardly and forwardly, and a vertical frame member joining the forward ends of the top and bottom frame members, a steering wheel supported in connection with the front end of the frame, a seat member pivoted to the upper forward end of the frame and extending rearwardly in substantially a horizontal plane, the rear end of the seat member having a depending crank rod, a crank shaft mounted in the rear end of the frame and said crank rod being coupled with one of the cranks of said crank shaft, drive wheels mounted upon said crank shaft and operated through the rotation of said crank, a spring actuated crank rod supported in connection with the lower frame member and having a forked end portion, the separate members of which are coupled with two other cranks of the crank shaft arranged angularly with reference to the first named crank of said shaft, two spring members supported upon guide rods slidably engaging the upwardly inclined top frame member and pivotally coupled to the seat member for moving the seat member in an upward direction and to aid in the propulsion of the drive wheels, and said frame being tubular in form and consisting of similar side portions.

9. In a wheeled vehicle, a propelling means for the drive wheels of said vehicle comprising a crank shaft having a plurality of angularly disposed cranks, a manually operated crank rod operatively engaging one of the cranks of said shaft, and automatically actuated means operatively engaging another crank of said shaft disposed angularly with reference to the first named crank.

10. In a wheeled vehicle, a propelling means for the drive wheels of said vehicle comprising a crank shaft having a plurality of angularly disposed cranks, a manually operated crank rod operatively engaging one of the cranks of said shaft, automatically actuated means operatively engaging another crank of said shaft disposed angularly with reference to the first named crank, and said last named means involving a spring actuated rod.

11. In a wheeled vehicle, a propelling means for the drive wheels of said vehicle comprising a crank shaft having a plurality of angularly disposed cranks, manually operated means operatively engaging one of the cranks of said shaft, automatically actuated means opertively engaging another crank of said shaft disposed angularly with reference to the first named crank, said last named means involving a spring actuated rod, and tensional means cooperating with said manually operated means for moving the same in one direction.

In testimony that I claim the foregoing as my invention I have signed my name this 15th day of February, 1928.

THOMAS B. KEOGH.